Jan. 27, 1959 C. W. EARP 2,871,290
ELECTRIC SIGNAL COMMUNICATION SYSTEMS
Filed Dec. 5, 1951 4 Sheets-Sheet 1

Inventor
C.W. EARP
By Philip M. Bolton
Attorney

Inventor
C. W. EARP
By Philip M. Bolton
Attorney

Inventor
C.W. EARP
By Philip M. Bolton
Attorney

Jan. 27, 1959 C. W. EARP 2,871,290

ELECTRIC SIGNAL COMMUNICATION SYSTEMS

Filed Dec. 5, 1951 4 Sheets-Sheet 4

Inventor
C. W. EARP
By Philip M. Bolton
Attorney

United States Patent Office 2,871,290

Patented Jan. 27, 1959

2,871,290

ELECTRIC SIGNAL COMMUNICATION SYSTEMS

Charles William Earp, London, England, assignor to International Standard Electric Corporation, New York, N. Y., a corporation of Delaware Application December 5, 1951, Serial No. 260,073

Claims priority, application Great Britain December 20, 1950

7 Claims. (Cl. 178—43.5)

The present invention relates to electric signal communication systems of the kind in which a signal wave is sampled at frequent intervals at the transmitter, and in which information regarding some characteristic of each sample is conveyed to the receiver, from which information the signal wave is reconstructed.

In the specification of co-pending application of Charles William Earp, Serial No. 257,807, filed November 23, 1951, a communication system is described and claimed in which the information regarding the signal sample is conveyed to the receiver by signals from which it is possible to derive two or more parameters or indices somewhat in the manner of a code modulation system, but with this important difference, that no quantising process is employed, all indices representing the signal sample with respect to a continuous scale, so that the signal samples are reproduced at the receiver without the distortion inherent in a code modulation system. The distinctive feature of this new system is that at least one of the indices is ambiguous; that is, any given index value represents more than one value of the signal sample. Frequently all the indices are ambiguous. The advantage gained by the use of ambiguous indices is a substantial improvement in signal-to-noise ratio without the introduction of signal distortion.

The proper signal value represented by the ambiguous index is completely determined at the receiver with the help of the other index or indices, as is fully explained in the specification already referred to.

The present invention covers a modification of this ambiguous index system which is applicable under certain conditions which are frequently quite practicable to fulfill. Briefly, only one index is employed, this index being ambiguous, the ambiguity being resolvable provided that two conditions are satisfied, namely:

(1) The sampling frequency is chosen sufficiently high, having regard to the nature of the signal wave, and (2) A demodulation arrangement is used in the receiver of a kind which takes note of the rate and direction of drift of the received index signals.

In a commercial speech communication system, on account of the nature of the signal wave, the first of these conditions may be fulfilled by the use of a sampling frequency which is no higher than would be used in any of the known pulse communication systems. This point will be dealt with more fully later.

The present invention accordingly enables similar advantages as regards signal-to-noise ratio to be obtained as in the system described in the specification of co-pending application of Charles William Earp, Serial No. 257,807, filed November 23, 1951, but with simpler arrangements, in certain favourable circumstances. However the invention may not be of any advantage when the signal wave to be transmitted is of an unsuitable character, in which case the arrangements covered by the above-mentioned application should be used, since these arrangements do not impose any conditions on the signal wave.

Having explained in general terms the nature of the present invention, a definite statement will now be made as to its scope. The invention provides an electric communication system comprising at a transmitter, means for periodically sampling a signal wave, means for deriving from each sample a single index representing the signal sample ambiguously on a continuous scale, and means for transmitting the index over a communication medium to a receiver; and at the receiver, means responsive to the rate and direction of drift of the received indices for recovering therefrom the said signal wave unambiguously.

By an "index" is meant any quantity or parameter, such as the time deviation or amplitude of a pulse, or the frequency of a wave, which can be used to represent some characteristic of a sample of asignal wave.

The invention will be described with reference to the accompanying drawings, in which.

In order to illustrate the invention, a pulse position modulation speech communication system will first be described, in which the speech frequency band will be assumed to extend up to 3,000 cycles per second. In order that the speech wave may be reproduced with sufficient fidelity, a sampling rate of 10,000 times per second will be assumed. The sampling period of 100 microseconds can conveniently provide 24 speech channel periods and one synchronizing period, all of duration 4 microseconds. In order to provide adequate guard intervals, the time excursion of the pulses transmitted in the various channel periods will be limited to ±1 microsecond.

Figure 1:
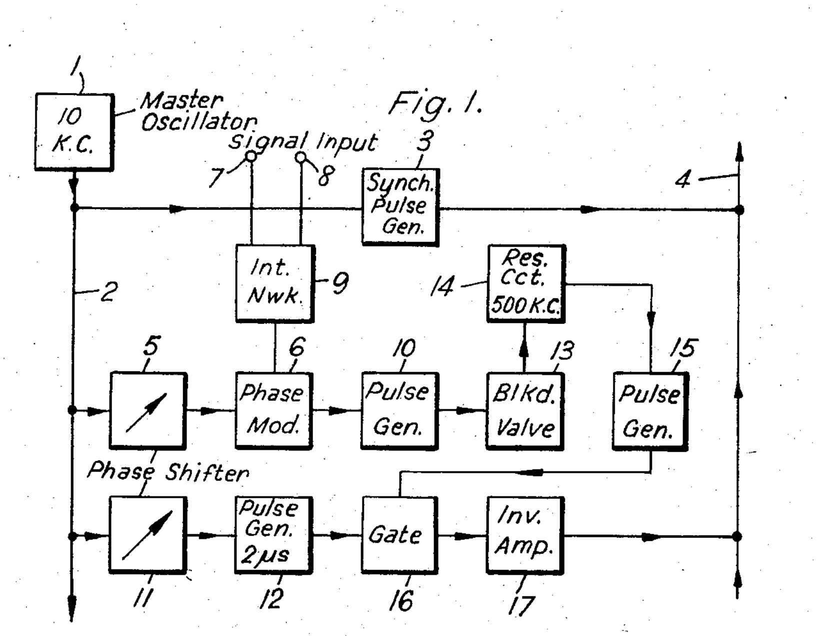
Fig. 1 shows a block schematic circuit diagram of a transmitter for a multichannel communication system according to the invention employing ambiguous index pulses.

The transmitting arrangements for this system are shown in Fig. 1, in which only the apparatus for one channel is shown. A master oscillator 1 generates waves of the sampling frequency (10 kilocycles per second) and supplies them to a conductor 2 to which the apparatus for all the channels is connected. A synchronising pulse generator 3 is also connected to conductor 2. This generator produces a train of synchronising pulses with a repetition frequency of 10 kilocycles per second by a well known process in which the waves generated by the oscillator 1 are squared and differentiated to produce pairs of positive and negative differentiated pulses, the negative pulses being eliminated by a limiting amplifier and the positive pulses given a suitable characteristic duration such, for example, as 1 microsecond. The synchronising pulses are supplied to an output conductor 4 leading to a cable (not shown) or radio transmitter (also not shown) or other means of transmitting the pulses over the communication medium. The outputs of the apparatus corresponding to all the channels will also be connected to conductor 4.

The channel apparatus shown in Fig. 1 comprises an adjustable phase shifter 5 which delivers the waves from the oscillator 1 to a phase modulator 6 of any suitable known type. The signal wave to be conveyed over the channel concerned is applied to terminals 7 and 8 and thence through an integrating network 9 to the phase modulator 6. The network 9 is not essential and could be omitted, but is a desirable element for reasons which will be explained later.

The phase modulated waves at the output of the phase modulator 6 are applied to a pulse generator 10 generally similar to the generator 3, whereby a train of time position modulated pulses will be obtained with a mean repetition frequency of 10 kilocycles per second. Any convenient duration such as 0.1 microsecond may be chosen for these pulses, which will be called "channel pulses."

A second adjustable phase shifter 11 is also connected to conductor 2 and supplies the waves from the oscillator 1 to a gating pulse generator 12, also generally similar to the generator 3, but designed to produce gating pulses having a duration slightly greater than 2 microseconds.

The channel pulse generator 10 is connected to a valve 13 which is normally blocked by a cut-off bias, the arrangement being such that each channel pulse sharply unblocks the valve, thereby shock-exciting a corresponding resonant circuit 14 tuned to 500 kilocycles per second.

This resonant circuit should preferably be designed to produce a short train of waves dying out after about 15 complete periods. The circuit 14 is connected to a further pulse generator 15, similar to 3, which produces a short train of about 15 short positive pulses, which will be called a "comb" of pulses. These comb pulses will be repeated at intervals tof 2 microseconds. The comb of pulses from generator 15, and a gating pulse from generator 12, are applied to a gating valve 16 in such manner that one of the pulses of the comb is selected. The selected pulse will appear as a negative pulse, and it is therefore applied to an inverting amplifier 17 and is delivered as a positive ambiguous index pulse to the output conductor 4. This transmitted index pulse could conveniently have a duration of 0.1 microsecond.

It will be understood that a group (not shown) of elements similar to 5 to 17 will be provided for each additional channel of the system, and will be connected in the same way between conductors 2 and 4.

The operation of the circuit will be described with reference to Fig. 2. In this figure each graph represents pulse amplitudes with reference to a horizontal time scale, and in all the graphs the time scale is the same. In graph A there are shown a series of periods each of 4 microseconds' duration separated by vertical dotted lines, the first of which periods is set aside as a synchronising period and is shown occupied by a synchronising pulse 18 produced by the generator 3 of Fig. 1. The remaining periods are the channel periods; not all of the 24 channel periods are shown.

Figure 2:
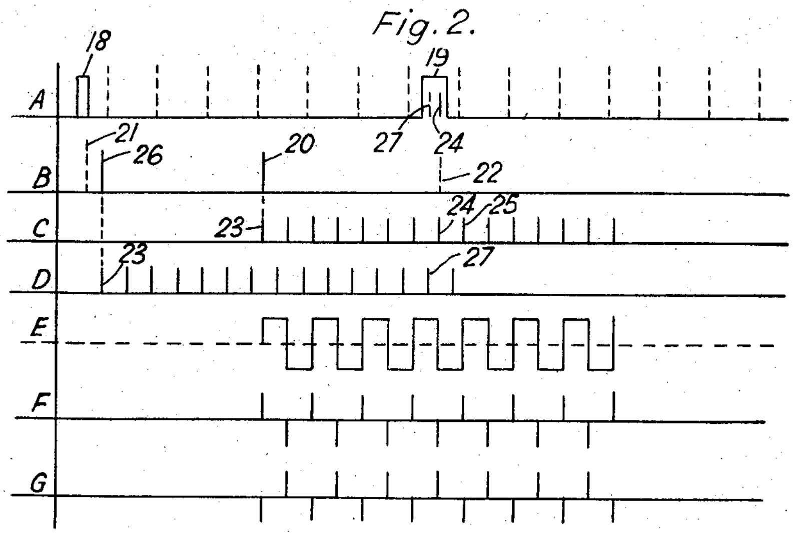
Fig. 2 shows graphical diagrams used in explaining the operation of circuits according to the invention.

It will be assumed that the channel apparatus shown in Fig. 1 is that for channel 7 and so in the seventh channel period in graph A, Fig. 2, there is shown the gating pulse 19 generated by the generator 12, Fig. 1. The phase shifter 11 should be adjusted so that the pulse 19 is approximately centred in the seventh channel period.

In graph B, Fig. 2, is shown a channel pulse 20 produced by the generator 10 (Fig. 1) as it appears when the modulating signal voltage applied to terminals 7 and 8 is zero. The dotted lines 21 and 22 represent the limits of time excursion of the pulse 20, when modulated, which are separated by about 7 channel periods.

Graph C represents the comb of pulses produced by the generator 15. The pulse 23 is shown as coinciding in time with the pulse 20 which initiates the comb by means of elements 13, 14 and 15 as already explained. In actual fact the pulse 23 will be slightly later than the pulse 20 owing to the delay in producing the train of waves in the resonant circuit 14, but this delay is constant and it is simpler to disregard it.

Now the gating pulse 19 and the comb graph C are applied to the gating circuit 16, Fig. 1, and accordingly only a single one of the pulses of this comb, namely pulse 24, will be selected and transmitted as an index pulse through the inverting amplifier 17. It will be apparent that as the phase shifter 5 (Fig. 1) is adjusted, the pulse 20 and the comb, graph C, will be shifted bodily along the time axis. The adjustment should be such that the pulse 24 selected by the gating pulse 19 is approximately at the centre of the comb. This adjustment does not have to be very accurate. The selected index pulse 24 is shown by the full line inside the gating pulse 19 of graph A.

Now if the channel pulse 20 is assumed to be time modulated, and moves to the left, the comb will move with it, and the index pulse 24 will approach the left hand edge of the gating pulse 19. When it reaches this edge it will disappear, but since the duration of the gating pulse is approximately equal to the repetition period of the comb, the index pulse 24 will be replaced by the next pulse 25 which just appears inside the right-hand edge of the gating pulse 19. Thus as the pulse 20 moves continuously to the left, a continuous succession of index pulses will move from right to left across the gating pulse 19. Finally when the channel pulse 20 reaches a position such as 26 near the early limit 21, the comb will reach the position shown in graph D, and a pulse 27 near the right hand end of the comb will be selected by the gating pulse 19. This pulse 27 is shown dotted inside the gating pulse. Likewise, when the channel pulse 20 approaches the late limit 22, an index pulse from the beginning of the comb will be selected by the gating pulse.

Now it will be evident that each index pulse which is transmitted represents accurately any one of several positions of the channel pulse, and if the particular position indicated by the index pulse can be found, the time position of the channel pulse 20 can be reconstructed at the receiver. In the first embodiment described in the specification of co-pending application of Charles William Earp, Serial No. 257,807, filed November 23, 1951, this ambiguity is resolved by the use of a second index pulse produced from a second comb with a different repetition period, the time positions of the two index pulses signifying jointly and unambiguously the time position of the channel pulse. In the present case a different principle is used to reconstruct the signal wave without the use of a second digit. This principle will now be explained.

Let it first be assumed that the variations in signal amplitude are quite slow. If the gating pulse 19 (graph A, Fig. 2), and the index pulse 24 selected thereby, be recorded on an oscillograph, several index pulses will be seen to travel across the gating pulse in one direction one after another for a time, and then in the other direction for a time, as the signal amplitude increases and then decreases. Any given comb pulse will occupy several positions in the gating pulse before disappearing. The successive time positions of the transmitted index pulses will therefore indicate whether the signal amplitude is increasing or decreasing, and this can be used at the receiver to reconstruct the signal wave.

If the variations in signal amplitude now be suffered to occur more and more rapidly, any given comb pulse will occupy fewer and fewer positions in the gating pulse before disappearing until a time may come such that a comb pulse only occupies one position, or even may be missed out altogether. When this condition has been reached, successive transmitted index pulses will cease to give correct information as to the variations of the signal amplitude. Therefore, in order that the signal wave may be reconstructed at the receiver without distortion, the sampling rate (that is, the frequency generated by the master oscillator 1) must be chosen so that for the type of signal to be transmitted, a given comb pulse will always occupy several positions in the gating pulse before disappearing.

With some types of signal, this sampling frequency might have to be chosen so high that no advantage would be gained by the use of the present invention. However, with speech signals or even music signals, the proportion of energy residing in the upper part of the frequency band (from which the most rapid variations in signal amplitude would be derived) is so small that the conditions are met by the use of a sampling frequency of the same order as that commonly used for ordinary position modulation pulse systems.

Figure 3:
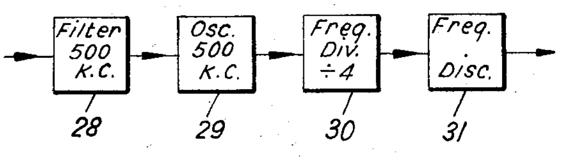
Fig. 3 shows the demodulating arrangements in each channel of this system.

In the receiver, conventional arrangements not shown, controlled by the received synchronising pulses, are employed for selecting the index pulses corresponding to any given channel, which are applied to the demodulating arrangement shown in Fig. 3. The index pulses are passed through a filter 28 designed to select that harmonic of the recurrence frequency which has a period equal to the period of the comb (2 microseconds). This harmonic will accordingly be the 50th harmonic with a frequency of 500 kilocycles. The selected harmonic is then applied to synchronise an oscillator 29 arranged to generate waves at a frequency of 500 kilocycles per second. The frequency of these waves is then divided down to 125 kilocycles per second by a frequency divider 30, and the waves of divided frequency are applied to a frequency discriminator 31 designed for a frequency of 125 kilocycles per second.

The elements 29 and 30 are not absolutely essential and could be omitted if the discriminator 31 is designed for a frequency of 500 kilocycles per second. They are however desirable since they permit rather greater time deviation of the channel pulse 20 (Fig. 2) without introducing ambiguity or discriminator distortion. This point will be dealt with later.

A frequency discriminator effectively compares the phases of two successive portions of the wave and produces an output voltage determined in magnitude and sign by the rate of change of the phase.

By selecting the particular frequency of 500 kilocycles per second for application to the discriminator circuit, two received pulses differing in time position by 2 microseconds would produce 500 kilocycle waves in identically the same phase, so it can be seen that when an index pulse which has just disappeared beyond one edge of the gating pulse is replaced by the next one which has appeared just inside the other edge, the replacing pulse produces just the same effect on the discriminator circuit as would the one which has been replaced.

Since the discriminator indicates the rate of change of phase of the selected harmonic, and its sign, it also indicates the rate at which the received index pulses are shifting along the time axis, and the direction of shift. Hence the signal wave is determined from the received index pulses by observing the manner in which they move, without the necessity for knowing the actual amplitude represented by any individual index pulse.

It is clear that the wave which is recovered from the index pulses will be the differential of the wave with which the channel pulse 20 (Fig. 2) is modulated. Accordingly if the integrating network 9 is employed, as recommended, in the transmitter, the wave recovered from the discriminator will be the same as the original signal wave applied to terminals 7 and 8.

If this integrating network is not used in the transmitter, it will be necessary to connect an integrating network (not shown) after the discriminator 31 in Fig. 3. It is emphasised that only one of these integrating networks is needed.

It may be added that ideally the duration of the gating pulse 19 (graph A, Fig. 2) should be just equal to the repetition period of the comb pulses (2 microseconds). However it would not be possible to maintain the adjustment accurately in practice, and it is better, therefore, to make this duration slightly exceed 2 microseconds, in which case occasionally two comb pulses will be selected. This does not matter, because two such pulses, being separated by 2 microseconds, will have the same effect on the discriminator as one pulse. Alternatively, the gating circuit 16 (Fig. 1) may be designed to suppressed the second pulse.

Referring again to Fig. 2, it will be observed that the total time excursion of the channel pulse 20 is considerably greater than the time excursion of the index pulses which are actually transmitted, which is only ±1 microsecond. The signal wave recovered at the receiver will have amplitude corresponding to the time excursion of the channel pulse 20, but the noise which is picked up is only that which accompanies the index pulses. The signal-to-noise ratio is therefore considerably increased over that which would have been obtained with a conventional 24 channel position modulation pulse system employing a deviation of ±1 microsecond. Actually, more than 20 decibels improvement of signal-to-noise ratio may be possible under favourable conditions.

Clearly the circuit can be designed to produce any desired improvement in signal-to-noise ratio by choosing the ratio of the total deviations of the channel pulse and index pulse accordingly. It is however necessary to arrange that the number of pulses in the comb (graph C, Fig. 2) is such that the total duration of the comb is at least equal to the interval between the limits 21 and 22 (graph B).

The advantage gained by using the integrating network 9 in the transmitter is that it reduces the amplitudes of the high-frequency components of the signal wave as compared with the amplitudes of the low-frequency components, and therefore such high-frequency components do not produce such a rapid drift of the index pulses. This permits an increase in the permissible deviation of the channel pulse 20 (Fig. 2) with a corresponding increase in the signal-to-noise ratio. It is to be noted also that the integrating network may for this reason enable an appreciable advantage to be gained even when the signal wave has the energy more or less evenly distributed over the whole frequency band.

The use of the integrating network 9 effectively converts the arrangement into a pulse frequency modulation arrangement i. e. an arrangement in which the repetition frequency of the pulses is modulated in accordance with the amplitude of the original signal. The same effect may be produced by the slight modification of Fig. 1 shown in Fig. 4. Certain elements are the same as in Fig. 1 and have been given the same designation numbers. The modification consists in replacing the elements, 5, 6, 9, 10, 13 and 14 by the single element 32 which is an oscillator arranged to generate a mean frequency of 500 kilocycles per second and to be frequency modulated in any suitable conventional manner by a signal wave applied to terminals 7 and 8.

The pulse generator 15 as before converts the frequency modulated waves into a train of short pulses which will have a mean spacing of 2 microseconds. One of these pulses is picked out by each 2 microsecond gating pulse supplied by the pulse generator 12. The index pulses transmitted over conductor 4 by the arrangement of Fig. 4 will be indistinguishable from those transmitted by the arrangement of Fig. 1.

Figure 4:
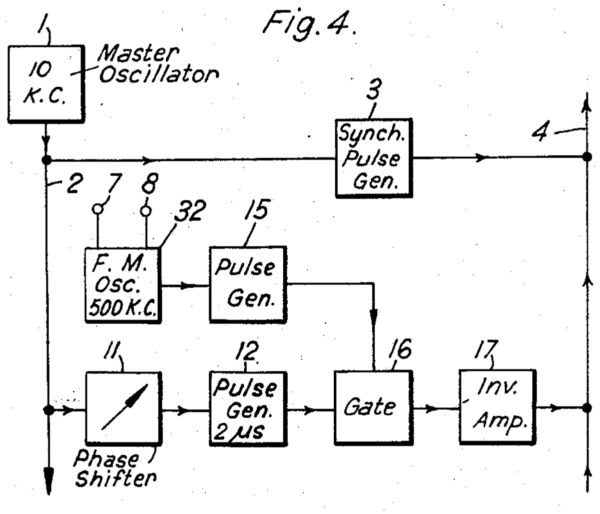
Fig. 4 shows details of a modified transmitter according to the invention.

It will be noted that it is not necessary to synchronise the oscillator 32 with the master oscillator 1, since the receiver can only recognise the rate and direction of movement of the received index pulses. However, the mean frequency of the oscillator 32 should preferably be stabilised as closely as possible at 500 kilocycles per second, otherwise should it drift away from this value, the signal wave recovered at the receiver will acquire a direct current bias due to the difference between the mean oscillator frequency and the frequency to which the filter 28 (Fig. 3) is tuned. An integrating network will, of course, not be required after the discriminator 31 (Fig. 3) when the transmitting arrangement of Fig. 4 is used.

Figure 5:
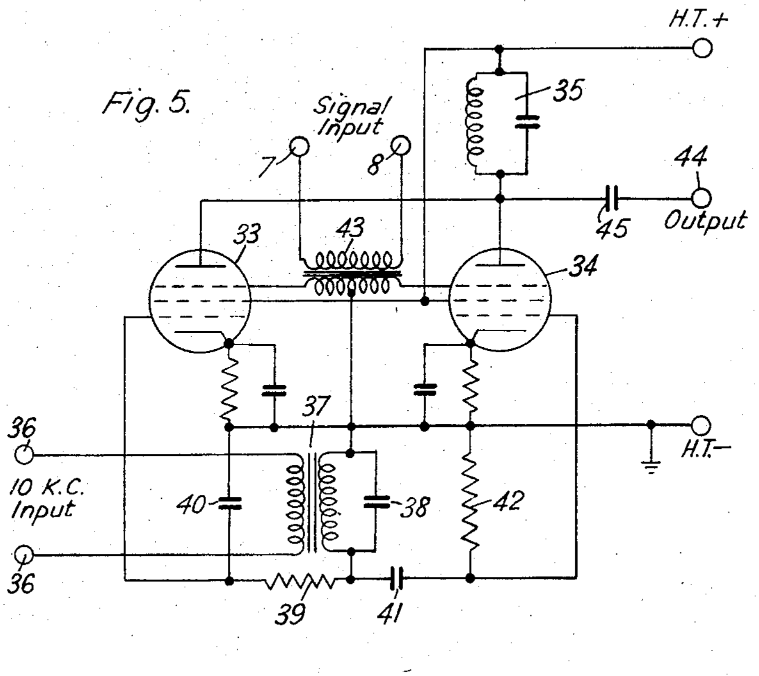
Figs. 5 and 6 show details of certain elements of Fig. 1.

Fig. 5 shows details of the preferred form of the phase modulator 6 shown in Fig. 1. It is of a known type comprising two pentode valves 33 and 34 sharing in common an anode load comprising a parallel resonant circuit 35 tuned to the frequency of the master oscillator 1 (10 kilocycles per second). This oscillator should be connected to the input terminals 36 of the modulator, these terminals being connected to an input transformer 37 tuned to 10 kilocycles per second by the capacitor 38. The secondary winding of this transformer is connected between ground and the control grids of the valves 33 and 34, phase shifting networks comprising respectively the resistor 39 and capacitor 40, and the capacitor 41 and resistor 42 being interposed, whereby the phase of the waves applied to these grids is shifted by plus or minus 45° respectively.

The terminals 7 and 8 for the modulating signal wave are connected to a transformer 43 having a secondary winding which is connected between the suppressor grids of the two valves, and which has a centre tap connected to ground. The output phase-modulated waves are obtained from a terminal 44 connected to the anodes of the valves through a blocking capacitor 45.

The circuit operates in the following way. Equal and opposite signal voltages are applied to the suppressor grids of the valves, and this increases the anode current of one valve and decreases that of the other. The output alternating current is the resultant of two currents in quadrature, one of which is decreased by the signal voltage and the other increased. The phase of the output current therefore varies in accordance with the signal voltage.

Figure 6:
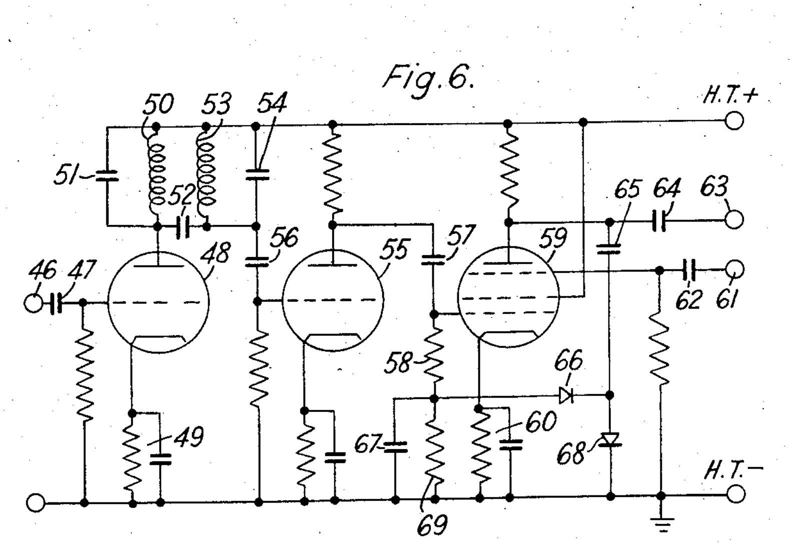

Fig. 6 shows details of the elements 13, 14, 15 and 16 of Fig. 1 combined in a single circuit. In Fig. 6 the pulses from the generator 10 (Fig. 1) are applied to an input terminal 46 which is connected through a capacitor 47 to the control grid of a valve 48 which is normally blocked by cathode bias produced by the network 49. Connected in series with the anode circuit of valve 48 is a parallel-resonant circuit comprising an inductor 50 and a capacitor 51. This resonant circuit is coupled through a capacitor 52 to a second similar parallel-resonant circuit comprising an inductor 53 and a capacitor 54.

Both the parallel-resonant circuits should be tuned to the same frequency, which will be slightly different from 500 kilocycles per second. The frequency should be such that the elements 50 to 54 together form a narrow band-pass filter with the band centred on 500 kilocycles per second. The elements 50 to 54 form the resonant circuit 14 of Fig. 1. The bandwidth and the damping of the parallel-resonant circuits may be chosen so that when the circuit is shock-excited by the sudden unblocking of the valve 48 by a positive pulse from the generator 10 (Fig. 11), a train of output waves is produced, the amplitude of which expands uniformly from zero and then contracts again, thereby producing about 15 positive and 15 negative loops of appreciable amplitude. This output wave is applied to a limiting valve 55 through a large blocking capacitor 56, the valve 55 being so biased and arranged that there are produced at the anode a series of about 15 positive and 15 negative rectangular waves or pulses, according to the well known "squaring" technique. These waves are differentiated by the capacitor 57 and resistor 58 to produce about 15 pairs of short positive and negative differential pulses which are applied to the control grid of the gating valve 59, which is normally biassed beyond the cut-off by the cathode bias network 60. The negative differential pulses have no effect on the gating valve, and the 15 positive differential pulses constitute the comb illustrated in graph C, Fig. 2. Gating pulses from the generator 12 (Fig. 1) are also applied to terminal 61 and through the blocking capacitor 62 to the suppressor grid of the gating valve, each gating pulse permitting one of the positive comb pulses to pass from the anode to the output terminal 63 through the blocking capacitor 64. This output pulse is the corresponding index pulse.

In order to prevent the gating valve from responding to a second comb pulse (which might otherwise be selected in circumstances explained above), the anode of the valve 59 is connected through a capacitor 65 and a rectifier 66 to the capacitor 67 connected in series between the resistor 58 and ground. The leading edge of an output index pulse 1 (which will be negative-going because of the inversion through the gating valve) charges the condenser 67 negatively, thereby increasing the grid bias so that the valve 59 will not respond to the following comb pulse. A second rectifier 68 connects the capacitor 65 to ground, and provides a low resistance path for the positive going trailing edge of the index pulse. The resistor 69 shunting the condenser 67 should be chosen so that the corresponding time constant is large compared with the repetition period of the comb (2 microseconds), but small compared with the repetition period of the channel pulses (100 microseconds), so that the condenser 67 will be substantially discharged by the time the next channel pulse arrives at terminal 46.

The elements 65 to 69 are however not essential, and could be omitted.

Figure 7:
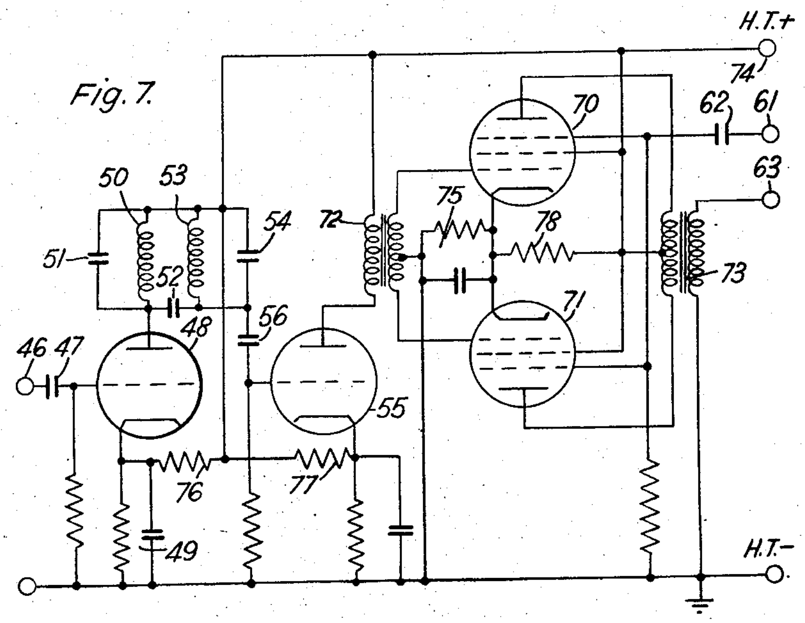
Fig. 7 shows a modification of Fig. 6.

In the arrangements which have been described so far, the transmitted index pulses are all of the same sign. Fig. 7 shows a modification of Fig. 6 by which both positive and negative index pulses are employed. Certain elements of Fig. 7 are the same as corresponding elements in Fig. 6 and have been given the same designation numbers.

The principal difference between the two figures is that the gating valve 59 of Fig. 6 is replaced in Fig. 7 by two gating valves 70 and 71 arranged in push-pull fashion. The anode circuit of the valve 55 is coupled to the control grids of the valves 70 and 71 by means of a transformer 72 whose secondary winding has a centre tap connected to ground. The anodes of the valves are connected to the output terminal 63 through a transformer 73 the primary winding of which has a centre tap connected to the positive high tension terminal 74. The suppressor grids of the valves 70 and 71 are both connected to terminal 61 through the blocking capacitor 62. The cathodes of the valves 70 and 71 share a cathode bias network 75 which connects them to ground. Resistors, 76, 77 and 78 are shown connecting the cathodes of the valves 48, 55, and 70 and 71, to the positive high tension terminal 74, for fixing the cathode potentials. Similar resistors (not shown) could have been provided in Fig. 6.

The only other change is that the resonant circuit comprising the elements 50 to 54 should be tuned to 250 kilocycles per second instead of to 500 kilocycles per second.

The transformer 72 should be designed to differentiate the rectangular waves produced by the limiting valve 55. These rectangular waves are shown in graph E, Fig. 2, and graph F shows the corresponding comb of differential pulses applied to the control grid of the valve 70. These are alternatively positive and negative. Graph G shows the comb of differential pulses applied to the control grid of the valve 71, and each of them is opposite in sign to the corresponding pulse of graph F.

This gating pulses such as 19 (graph A, Fig. 2) which should have a duration of slightly more than 2 microseconds, as before, are applied at terminal 61 (Fig. 7), in order simultaneously to open both the gating valves 70 and 71. Thus since the negative differential pulses have no effect on either of these valves, the gating pulse will select an index pulse from whichever of the two valves has a positive differential pulse applied to the control grid. Let it be supposed for example, that a positive differential pulse is applied to the valve 70, and that the transformer 73 is so connected that a positive index pulse is applied to the output terminal 63, then at some other time, when a positive differential pulse is applied to the valve 71 during the period of a gating pulse, the latter will select a pulse from valve 71, and since this pulse is applied to the opposite end of the primary winding of the transformer 73, a negative output index pulse will be produced. Thus it will be seen that the index pulses are sometimes positive, and sometimes negative. Such pulses are not suitable for transmission by amplitude modulation of a carrier wave, but may conveniently be transmitted directly over a coaxial cable, for example, or by frequency modulation of a carrier wave.

It will be understood that arrangements (not shown) on the same lines as those described with reference to Fig. 6 may be employed to suppress any extra index pulse which may be selected by the gating valves 70 and 71.

Figure 8:
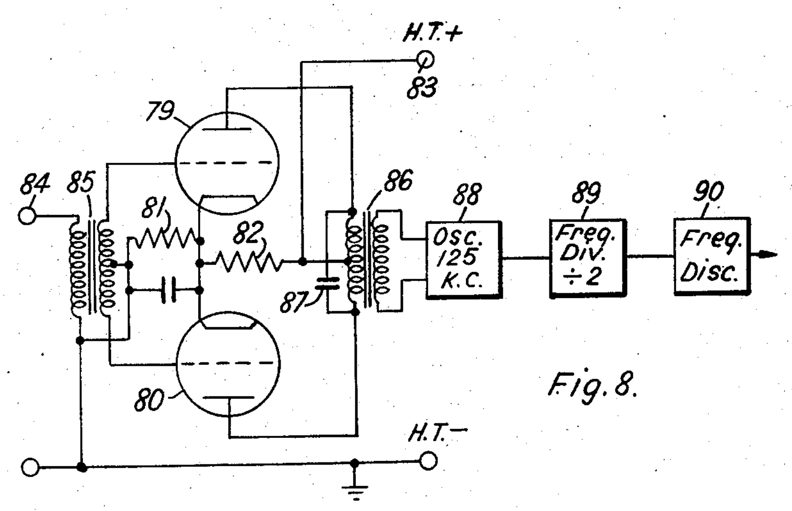
Fig. 8 shows details of the arrangements at the receiver corresponding to Fig. 7.

A suitable arrangement for receiving the positive and negative index pulses is shown in Fig. 8.

Two valves 79 and 80, arranged in push-pull fashion, are normally blocked by positive cathode bias provided by a bias network 81, and a resistor 82 connecting the cathode to the positive high tension terminal 83. The received index pulses are applied to a terminal 84 connected to the control grids of the valves 79 and 80 through a transformer 85 the secondary winding of which has a centre tap connected to ground. The anodes of the valves 79 and 81 are connected to opposite ends of the primary winding of the transformer 86, this winding having a centre tap connected to the positive high tension terminal 83. The primary winding of the transformer is tuned by a capacitor 87 to 250 kilocycles per second. The resonant circuit so formed should have a high Q-value.

It will be evident that positive and negative pulses received at the input terminal 84 will respectively unblock the valves 79 and 80 (assuming that the input transformer 85 is appropriately poled). When the valve 79 is unblocked, it shock-excites the resonant circuit 86, 87 in a given phase. It is evident that the valve 80 can only be unblocked at times which differ from the times when the valve 79 is unblocked by an odd number of half-periods of the resonant circuit. Thus since the anode of the valve 80 is connected to the lower end of the primary winding of the transformer 86, when unblocked it will always shock-excite the resonant circuit to oscillate in the same phase as the valve 79, when unblocked. In this way both positive and negative index pulses are made to have the same effect on the resonant circuit.

This resonant circuit should have a high Q-value in order that it may be excited into substantially continuous oscillations at 250 kilocycles per second. These oscillations are used to synchronise an oscillator 88 which generates the half-frequency, namely 125 kilocycles per second. A frequency dividing stage 89 dividing by two then supplies waves at 62.5 kilocycles per second to a frequency discriminator 90 designed for a mean frequency of 62.5 kilocycles per second. As already explained, an integrating network (not shown) should follow the frequency discriminator 90 if the integrating network 9 (Fig. 1) is not provided.

The advantage of the plan of using index pulses of both signs is that index pulses derived from two adjacent comb pulses are now distinguishable and the distinction is effectively utilised at the receiver by the use of the half-frequency of 250 kilocycles per second. It is now possible to accommodate rather more rapid variations in signal amplitude, because if, for example, a positive index pulse near one edge of the gating pulse is succeeded by a negative index pulse near the other edge of the gating pulse, it is then evident which way the signal amplitude is changing, while if both index pulses were positive, the matter might be in doubt.

It should be explained that in Figs. 6 and 7, the resonant circuit may be simplified, if desired, by omitting elements 52, 53 and 54, so that only a single parallel resonant circuit is used. The elements 50 and 51 should then be tuned to 500 kilocycles per second, and they may be so chosen so that about 15 comb pulses are produced.

In order to ensure that no ambiguity shall occur in interpreting the drift of the index pulses at the receiver, the sampling frequency should be so chosen in relation to the characteristics of the signal wave (after integration by the network 9, Fig. 1, if this is used) that the time positions of two successive index pulses do not differ by more than 1 microsecond (that is, about half the maximum total deviation of the duplex pulses). Then if a synchronised oscillator such as 29 (Fig. 3) is used in front of the discriminator, no ambiguity will occur. However, the phase shift at 500 kilocycles per second corresponding to 1 microsecond is so large that the relation between the phase shift and the corresponding signal amplitude in most discriminators is insufficiently linear. Thus it is desirable to introduce the frequency divider 30 (Fig. 3), by means of which the phase deviation is divided by 4, to bring it within the substantially linear range of the discriminator. If either or both of the elements 29 and 30 are omitted, then it will probably be necessary to reduce the time deviation of the channel pulse 20 (Fig. 2) or to increase the sampling frequency.

It should be made clear with reference to graphs A and C of Fig. 2, that the adjustment of the phase shifter 5 (Fig. 1) to enable the gating pulse 19 to pick out a pulse near the centre of the comb, when the modulating signal voltage is zero, can be quite approximate, and it is not necessary that the index pulse so selected should be at the centre of the gating pulse. It might be convenient to arrange so that the selected index pulse is near the leading or the trailing edge of the gating pulse. Moreover, it does not matter if the adjustment should drift. This is because the receiver only recognises the movements of the received index pulses.

In multichannel pulse systems it often happens that it is desired to transmit over the system a signal wave which occupies a much wider band than the normal signal wave. This requirement occurs for example when it is desired to provide a broadcasting circuit in a commercial speed communication system. Various arrangements have been proposed for combining several channels of such a system to provide a single wide-band broadcast channel, and while the arrangements for doing this are in theory quite simple, in practice great difficulties are found in carrying out the change satisfactorily.

The chief requirement in a case like this is to increase the sampling rate several times, and the matter becomes quite simple if the principles of the present invention are adopted.

In the usual multichannel pulse system, the sampling rate is limited by the two factors, namely the number of channels to be provided and the time deviation per channel necessary to secure a sufficiently good signal-to-noise ratio. It should be clear from Fig. 2 that in the case of the present invention, the effective time deviation of the channel pulse 20 (graph B, Fig. 2) is many times the time deviation of the index pulses which are actually transmitted, and extends over several whole channel periods. It thus follows that one limitation of the sampling rate is removed.

It is possible therefore to increase the sampling rate of each channel several times to a value suitable for a broadcast channel, and still accommodate the same number of channels in the reduced sampling period. In other words the channels will be operating for speech signals with a much higher sampling rate than would be normally necessary to transmit the corresponding frequency band, without a corresponding reduction in effective time deviation. Then any channel is immediately available for a broadcast channel with no alteration, except possibly a small reduction in modulation depth which may be necessary to avoid ambiguities due to rapid variation of signal amplitude resulting from the presence of a large number of high frequency components in the signal wave.

The advantages of the system according to the invention are listed below. Some of these advantages have already been alluded to above.

(1) A greatly improved signal-to-noise ratio is obtained.

(2) Channels may be adapted for broadcasting and other high quality channels without modification of the apparatus and without detriment to any features of the system.

(3) The feature by which the zero signal amplitude time position of the index pulses may be adjusted, for example, at one edge of the gating pulse, gives a certain amount of privacy, since such an arrangement is difficult to receive with conventional apparatus.

(4) If the integrator is used at the transmitter, supervisory signals may be transmitted by a 50-cycle or other low frequency wave of very large amplitude compared with the signal amplitude, without any over-loading or other deleterious effects. This is a great advantage, since supervisory signals are often required to be of large amplitude.

(5) Since for satisfactory operation the precise location of the index pulses with respect to the gating pulse is immaterial, the system is much easier to set up and adjust than a conventional pulse position modulation system; in which an accurate central adjustment of the pulse is essential and must be maintained, for the avoidance of distortion. The system of the invention is therefore also much more stable, since it does not matter if the zero position of the index pulses should drift.

(6) The use of a discriminator for demodulating the received pulses in itself gives an improvement of signal-to-noise ratio over conventional pulse demodulating arrangements of about 6 decibels.

I claim:

1. An electric communication system comprising at a transmitter, means for generating successive trains of short electric primary pulses which trains are time position modulated in accordance with successive samples of a signal wave, and which have a relatively large maximum time excursion, means for deriving from each of the said trains of primary pulses a time position modulated index pulse having a relatively small maximum time excursion, the time position of which represents ambiguously the time position of the primary pulse, a receiver, means for transmitting the index pulses over a communication medium to said receiver; and at the receiver, means responsive to the direction and rate of drift of the received index pulses for recovering from the index pulses a signal wave having successive amplitudes corresponding to the time excursion of the said primary pulses.

2. An electric communication system comprising a master oscillation generator arranged to produce waves at a sampling frequency, means for causing a signal wave to modulate the phase of said waves, means for deriving from the phase modulated waves a train of pulses having a pulse repetition frequency equal to an integral multiple of the sampling frequency, means for gating the train of pulses in order to select for each sample a single one of said pulses to serve as an index pulse, means for transmitting a succession of such index pulses over a communication medium to a receiver and at the receiver means responsive to the direction and rate of drift of the time positions of the received index pulses for reproducing said signal wave.

3. A system according to claim 2 in which the means for deriving the train of pulses comprises means for squaring and differentiating the phase modulated waves in order to obtain a series of alternately positive and negative differential pulses, means for eliminating all the pulses of one sign, a resonant circuit tuned to the said integral multiple of the sampling frequency, means for applying the pulses of the other sign to shock-excite said resonant circuit and means for squaring and differentiating the waves generated by said resonant circuit.

4. A system according to claim 2 in which said means for deriving comprises means for producing pulses of the said train all of the same sign.

5. A system according to claim 2 in which said means for deriving comprises means for producing pulses of the said train alternately positive and negative.

6. A receiver for translating a signal consisting of index pulses of alternate positive and negative values selected from successive trains of pulses time modulated in accordance with a desired signal, into the original signal comprising a resonant circuit tuned to a period equal to the period separating two pulses of the same sign of the said train, means for applying the pulses of the train to the resonant circuit in such manner that both positive and negative pulses shock-excite it in the same phase, means for dividing the frequency of the waves generated by the resonant circuit, a frequency discriminator means for applying the waves of divided frequency to said frequency discriminator and a utilization circuit for said discriminated waves.

7. A system according to claim 2 including an integrating network through which the signal wave is applied to modulate the phase of the said waves produced by the master oscillator generator.

References Cited in the file of this patent

UNITED STATES PATENTS

| | | |
|---|---|---|
| 2,429,616 | Grieg | Oct. 28, 1947 |
| 2,452,547 | Chatterjea et al. | Nov. 2, 1948 |
| 2,485,591 | Grieg | Oct. 25, 1949 |
| 2,547,001 | Grieg | Apr. 3, 1951 |
| 2,607,035 | Levine | Aug. 12, 1952 |